Patented Aug. 3, 1954

2,685,597

UNITED STATES PATENT OFFICE 2,685,597

STABILIZATION OF VINYL RESIN MONOMERS

Frank C. Pack, New Orleans, La., Richard N. Moore, Lake City, Fla., and William G. Bickford, Metairie, La., assignors to the United States of America as represented by the Secretary of Agriculture No Drawing. Application June 12, 1953, Serial No. 361,445

3 Claims. (Cl. 260—486)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the stabilization of vinyl resin monomers against polymerization initiated by heat and/or light during their preparation, storing, handling and the like.

An object of this invention is to provide compositions comprising polymerizable unsaturated organic compounds mixed with relatively minor amounts of a polymerization inhibitor, which compositions resist heat and/or light induced polymerization for unusually long periods. Another object is to provide a process of increasing the time for which polymerizable unsaturated organic compounds will resist heat and/or light induced polymerization by mixing the unsaturated compounds, in a liquid form, with a relatively minor amount of a non-volatile polymerization inhibitor which can readily be removed from the mixture.

In general the process provided by this invention comprises mixing a polymerizable unsaturated organic liquid with an amount of gossypol or dianilinogossypol sufficient to inhibit polymerization.

The process provided by this invention can suitably be applied to the stabilization of any polymerizable unsaturated organic compound capable of undergoing heat and/or light organic compound capable of undergoing heat and/or light induced polymerization. Such compounds may be liquid mono- or poly-olefinic, ethylenic, or acetylenic compounds or liquefiable mixtures thereof. The process is particularly applicable to increasing the induction period of normally liquid, polymerizable, terminally unsaturated vinyl resin monomers including the polymerizable styrenes such as styrene and its homologs and halides; the polymerizable vinyl esters such as vinyl acetate and its homologs and halides; the polymerizable acrylic or allylic esters such as methyl acrylate or diallyl phthalate and their homologs and halides; and liquid mixtures such as vinyl chloride-vinyl acetate mixtures and the homologs and halides thereof.

The gossypol or dianilinogossypol can suitably be mixed with polymerizable unsaturated organic liquids which are liquid at moderately elevated temperatures under moderate pressure and which are solid at normal room temperature (i. e., liquefiable, polymerizable unsaturated organic compositions), and are effective stabilizers for such compositions in their solid or liquid state.

The concentrations in which the gossypol or dianilinogossypol are effective in stabilizing such polymerizable materials are unobviously low—0.01% of dianilinogossypol is comprable with 10 times as much hydroquinone. In general gossypol or dianilinogosspyol are effective stabilizers in concentrations of from about 0.001 to 1% based on the weight of the polymerizable component; and concentrations of from about 0.01 to 0.1% are preferred. The gossypol and dianilinogossypol can suitably be employed individually or in the form of mixtures in proportions above or below those in which they are soluble in the unsaturated liquid to be stabilized, and/or in conjunction with other polymerization inhibiting agents or retarding agents. The proportions best suited for a particular application vary with the polymerizable materials to be stabilized and with the degree of stabilization desired. The optimum proportions can suitably be determined by simple experiments.

The following tables indicate comparisons of the effectiveness of gossypol and dianilinogossypol in stabilizing various polymerizable liquids. The viscosity values were determined by the use of Gardner bubble tube standards. Each monomer, freed of stabilizer by vacuum distillation, was added to a series of viscometer bubble tubes. Each bubble tube of the series contained a selected concentration level of the particular stabilizer under investigation. The bubble tubes containing monomer and stabilizer were then subjected to the polymerizing treatment (U. V. light or heat).

The experimental samples in the bubble tubes were compared, at intervals, with the Gardner bubble tube standards and the extent of polymer formation as indicated by viscosity measurements recorded. Controls (monomers free of stabilizer) were set up for each series of samples tested. Each test of the stabilizers in the indicated proportions was replicated.

*Table I.—Styrene*

| Time, Hours at 70.0° C. | Viscosities measured by Gardner bubble tube viscometer and reported in poises at 25.0° C. | | | | |
|---|---|---|---|---|---|
| | Control | Hydroquinone | | Dianilinogossypol | |
| | | 0.01% | 0.1% | 0.01% | 0.1% |
| Start | <0.50 | <0.50 | <0.50 | <0.50 | <0.50 |
| 3 | 1.65 | 0.85 | 0.85 | 0.50 | <0.50 |
| 8 | 3.70 | 1.25 | 1.25 | 0.50 | <0.50 |
| 27 | 27.0 | 17.6 | 17.6 | 8.84 | <0.50 |
| 32 | 36.2 | 22.7 | 22.7 | 17.6 | <0.50 |
| 51 | 148.0 | 98.5 | 98.5 | 98.5 | <0.50 |
| 56 | >148.0 | 148.0 | 148.0 | >148.0 | <0.50 |
| 75 | ------ | ------ | ------ | ------ | <0.50 |
| 100 | ------ | ------ | ------ | ------ | 0.50 |

*Table I(a)—Styrene*

| Time, Hours at 70.0° C. | Viscosities measured by Gardner bubble tube viscometer and reported in poises at 25.0° C. | | | | | | |
|---|---|---|---|---|---|---|---|
| | Control | Hydroquinone | | Gossypol | | Dianilinogossypol | |
| | | 0.01% | 0.1% | 0.01% | 0.05% | 0.01% | 0.05% |
| Start | <0.50 | 0.50 | <0.50 | <0.50 | <0.50 | <0.50 | <0.50 |
| 30 | 12.9 | 1.12 | <0.50 | 5.50 | 1.12 | 0.67 | <0.50 |
| 68 | 148.0 | 63.4 | 3.70 | 148.0 | 5.88 | 11.80 | <0.50 |
| 90 | >148.0 | 148.0 | 12.9 | >148.0 | 80.4 | 45.2 | <0.50 |
| 94 | (1) | >148.0 | 22.7 | >148.0 | 80.4 | 45.2 | 0.50 |
| 114 | (1) | (1) | 98.5 | (1) | 123.2 | >148.0 | 3.52 |
| 142 | (1) | (1) | >148.0 | (1) | >148.0 | (1) | 20.4 |
| 164 | (1) | (1) | (1) | (1) | (1) | (1) | 80.4 |

1 Solid at room temperature.

*Table II.—Methyl acrylate*

| Hours Under U. V. | Controls | Viscosities measured by Gardner Bubble tube viscometer and reported in poises at 25.0° C. | | | | | |
|---|---|---|---|---|---|---|---|
| | | Hydroquinone | | Gossypol | | Dianilinogossypol | |
| | | 0.01% | 0.1% | 0.01% | 0.05% | 0.01% | 0.05% |
| Start | <0.50 | <0.50 | <0.50 | <0.50 | <0.50 | <0.50 | <0.50 |
| 19 | >148.0 | >148.0 | >148.0 | 3.00 | <0.50 | <0.50 | <0.50 |
| 23 | (1) | (1) | (1) | >148.0 | <0.50 | <0.50 | <0.50 |
| 26 | (1) | (1) | (1) | (1) | <0.50 | <0.50 | <0.50 |
| 43 | (1) | (1) | (1) | (1) | 0.50 | >148.0 | <0.50 |
| 72 | (1) | (1) | (1) | (1) | >148.0 | (1) | <0.50 |
| 96 | (1) | (1) | (1) | (1) | (1) | (1) | >148.0 |

1 Solid at room temperature.

*Table III.—Vinyl acetate*

| | Control | Viscosities measured by Gardner bubble tube viscometer and reported in poises at 25.0° C. | | | | | |
|---|---|---|---|---|---|---|---|
| | | Hydroquinone | | Gossypol | | Dianilinogossypol | |
| | | 0.01% | 0.1% | 0.01% | 0.05% | 0.01% | 0.05% |
| Water bath at 120 hrs. Transfer to U. V. Lamp | | (1) | (1) | (1) | (1) | (1) | 0.50 |
| U. V. exposure at room temp., 48 hours | 6.27 | <0.50 | <0.50 | <0.50 | <0.50 | <0.50 | <0.50 |
| U. V. exposure at room temp., 60 hours | >148.0 | >148.0 | <0.50 | 0.50 | <0.50 | <0.50 | <0.50 |
| U. V. exposure at room temp., 66 hours | (2) | (2) | <0.50 | >148.0 | <0.50 | <0.50 | <0.50 |
| U. V. exposure at room temp., 90 hours | (2) | (2) | <0.50 | (2) | <0.50 | >148.0 | <0.50 |
| U. V. exposure at room temp., 114 hours | (2) | (2) | 0.65 | (2) | <0.50 | (2) | <0.50 |
| U. V. exposure at room temp., 160 hours | (2) | (2) | >148.0 | ------- | <0.50 | <0.50 | <0.50 |

1 No increase in viscosity from original value.
2 Solid at room temperature.

*Table IV*

| | Control | Time required for the viscosity within the several sample tubes to exceed 148.0 poises | | | | | |
|---|---|---|---|---|---|---|---|
| | | Hydroquinone | | Gossypol | | Dianilinogossypol | |
| | | 0.01% | 0.1% | 0.01% | 0.05% | 0.01% | 0.05% |
| Styrene (*a*) | 51 hrs | 56 hrs | 56 hrs | ---------- | ---------- | 56 hrs | 0.50 poises after 100 hours. |
| Styrene (*b*) at 70.0° C | 68 hrs | 90 hrs | 142 hrs | 68 hrs | 142 hrs | 114 hrs | 80.4 poises after 164 hrs. |
| Vinyl Acetate under U. V. light. | 60 hrs | 60 hrs | 160 hrs | 66 hrs | <0.50 after 160 hrs. | 90 hrs | <0.50 after 160 hrs. |
| Methyl Acrylate under U. V. light. | 19 hrs | 19 hrs | 19 hrs | 23 hrs | 72 hrs | 43 hrs | 96 hrs. |

We claim:

1. A composition, comprising, a polymerizable vinyl resin monomer, of the group consisting of styrene, methyl acrylate and vinyl acetate, mixed with an amount of a compound of the group consisting of gossypol and dianilinogossypol, sufficient to inhibit polymerization.

2. A composition, comprising, a polymerizable vinyl resin monomer, of the group consisting of styrene, methyl acrylate and vinyl acetate, mixed with an amount of gossypol sufficient to inhibit polymerization.

3. A composition, comprising, a polymerizable vinyl resin monomer, of the group consisting of styrene, methyl acrylate and vinyl acetate, mixed with an amount of dianilinogossypol sufficient to inhibit polymerization.

References Cited in the file of this patent

Adams et al.: Article in Jour. Am. Chem. Soc., vol. 60, No. 9, September 1938, pp. 2160–2.